US010790733B2

(12) United States Patent
Lin et al.

(10) Patent No.: US 10,790,733 B2
(45) Date of Patent: Sep. 29, 2020

(54) ROTOR WITH ASYMMETRIC ENERGY HARVEST WINDINGS

(71) Applicant: ABB Schweiz AG, Baden (CH)

(72) Inventors: Chenjie Lin, Fuquay Varina, NC (US); Ghanshyam Shrestha, Cary, NC (US); Mehanathan Pathmanathan, Västerås (SE); Pedro Rodriguez, Västerås (SE); Jan Mikael Westerlund, Espoo (FI); Tuomas Janhunen, Vantaa (FI)

(73) Assignee: ABB Schweiz AG, Baden (CH)

( * ) Notice: Subject to any disclaimer, the term of this patent is extended or adjusted under 35 U.S.C. 154(b) by 95 days.

(21) Appl. No.: 16/121,113

(22) Filed: Sep. 4, 2018

(65) Prior Publication Data

US 2020/0076286 A1 Mar. 5, 2020

(51) Int. Cl.
*H02K 19/28* (2006.01)
*H02K 3/28* (2006.01)
*H02K 19/02* (2006.01)
*H02K 3/48* (2006.01)
*H02K 3/32* (2006.01)

(52) U.S. Cl.
CPC ............... *H02K 19/28* (2013.01); *H02K 3/28* (2013.01); *H02K 3/325* (2013.01); *H02K 3/48* (2013.01); *H02K 19/02* (2013.01)

(58) Field of Classification Search
CPC .......... H02K 19/28; H02K 19/02; H02K 1/26; H02K 1/265; H02K 3/28; H02K 3/325; H02K 3/48; H02K 3/527; H02K 15/02
USPC .......................... 310/68 D, 216.091–216.096
See application file for complete search history.

(56) References Cited

U.S. PATENT DOCUMENTS

| | | | |
|---|---|---|---|
| 2,333,538 | A | 11/1943 | Liwschitz |
| 3,938,029 | A | 2/1976 | Wagner et al. |
| 4,079,446 | A | 3/1978 | Hertz |
| 6,051,953 | A | 4/2000 | Vithayathil |
| 7,592,785 | B2 | 9/2009 | Kimura et al. |
| 7,787,913 | B2 | 8/2010 | Cornell |
| 7,982,326 | B2 | 7/2011 | Tan et al. |

(Continued)

FOREIGN PATENT DOCUMENTS

| | | |
|---|---|---|
| CN | 107889545 A | 4/2018 |
| EP | 2043255 A2 | 4/2009 |

(Continued)

*Primary Examiner* — Michael Andrews
(74) *Attorney, Agent, or Firm* — J. Bruce Schelkopf; Taft Stettinius & Hollister LLP

(57) ABSTRACT

Unique systems, methods, techniques and apparatuses of exciterless synchronous machines are disclosed. One exemplary embodiment is a fractional slot synchronous machine comprising a rotor including a first pole pair including a first pole including a first plurality of slots having a first center point and arranged on a first outer surface in a slot pattern; a second pole pair including a second pole including a second plurality of slots having a second center point and arranged on a second outer surface in the slot pattern; energy harvest windings arranged in a winding pattern within a portion of the first plurality of slots and arranged in the same winding pattern within a portion of the second plurality of slots, the energy harvest winding being structured to receive a harmonic power from the stator; and a rectifier structured to receive the harmonic power from the energy harvest winding.

18 Claims, 5 Drawing Sheets

(56) References Cited

U.S. PATENT DOCUMENTS

| | | |
|---|---|---|
| 9,813,004 B2 | 11/2017 | Shrestha et al. |
| 2004/0199701 A1 | 10/2004 | Eckmuller |
| 2005/0146226 A1 | 7/2005 | Trainer et al. |
| 2008/0074910 A1 | 3/2008 | Casteel et al. |
| 2009/0315329 A1 | 12/2009 | Duffey et al. |
| 2011/0315496 A1 | 12/2011 | Bohori et al. |
| 2012/0211981 A1* | 8/2012 | De Wergifosse ......... H02P 1/50 290/31 |
| 2014/0029318 A1 | 1/2014 | Chen et al. |
| 2015/0249370 A1* | 9/2015 | Wirsch, Jr. ............. H02K 3/527 310/54 |
| 2015/0263526 A1 | 9/2015 | Kjaer et al. |
| 2016/0013744 A1 | 1/2016 | McLean |
| 2016/0118851 A1* | 4/2016 | Biebighauser ....... H02K 15/024 310/183 |
| 2016/0211787 A1* | 7/2016 | Shrestha ................. H02K 3/28 |
| 2017/0054393 A1* | 2/2017 | Ouyang ............... H02K 11/046 |
| 2018/0034396 A1 | 2/2018 | Shrestha et al. |

FOREIGN PATENT DOCUMENTS

| | | |
|---|---|---|
| EP | 2728805 A2 | 5/2014 |
| EP | 3245716 A1 | 11/2017 |
| WO | 2016115563 A1 | 7/2016 |

\* cited by examiner

ROTOR WITH ASYMMETRIC ENERGY HARVEST WINDINGS

BACKGROUND

The present disclosure relates generally to synchronous machines. In order to operate at synchronous speeds, some synchronous machines require an energized field winding incorporated into the machine rotor. Many synchronous machines use an external exciter unit to energize the field winding. Some synchronous machines include energy harvest windings, also known as energy harvesting coils, incorporated into the rotor to energize the field winding. The energy harvesting coils receive a harmonic component of alternating current power during machine operation. Existing synchronous machines suffer from a number of shortcomings and disadvantages. There remain unmet needs including reduced energy harvesting circuit complexity, reduced DC power supply circuit complexity, increased reliability, simplified rotor construction, reduced power losses in DC power supply, and reduced total harmonic distortion. For instance, a field winding may require more power than a single energy harvesting coil can harvest, but adding more coils to each rotor pole pair increases the complexity of the harvesting circuit and the DC power supply circuit. The arrangement of the additional coils may not harvest the harmonic efficiently, increasing total harmonic distortion. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for exciterless synchronous machines. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
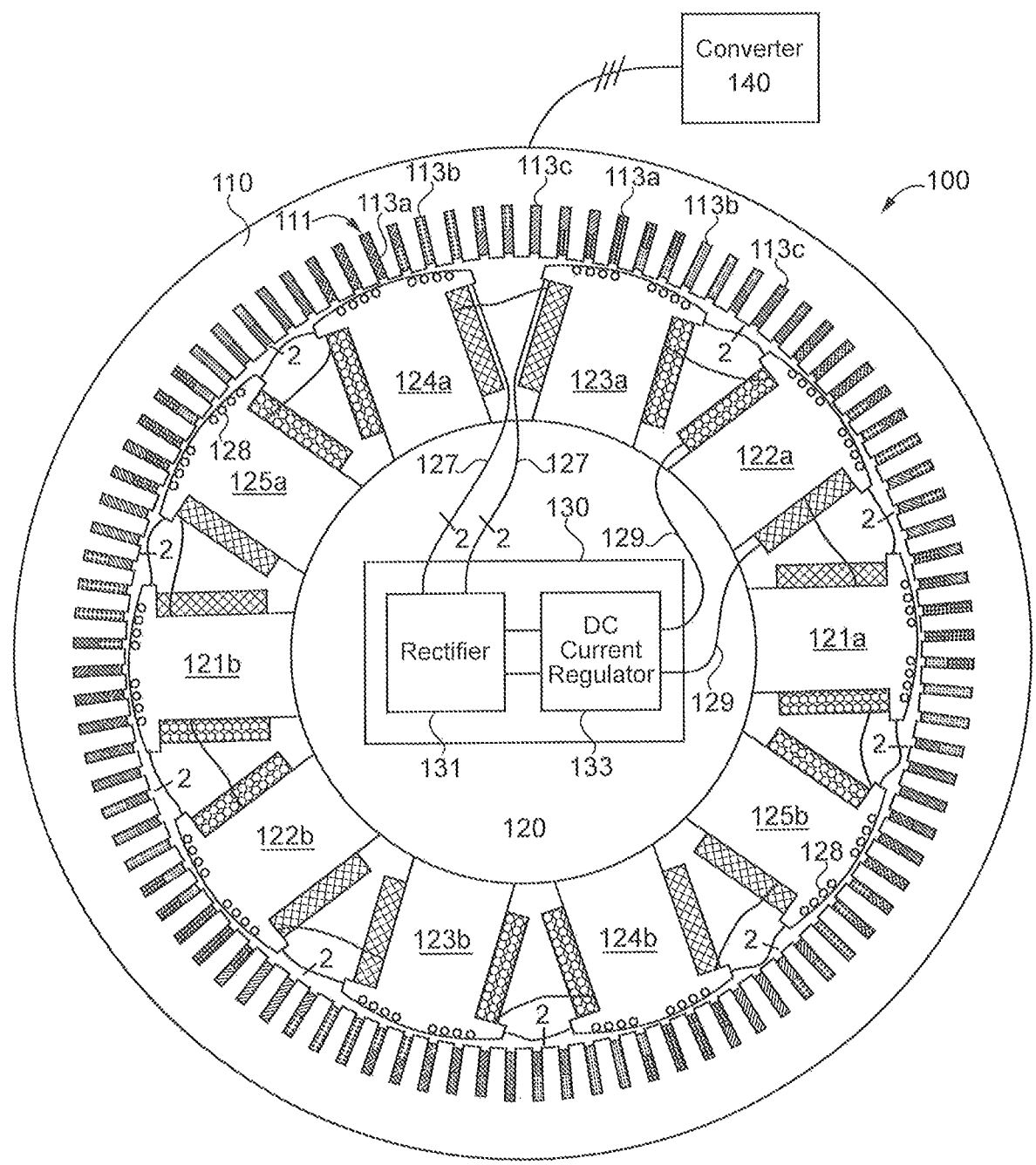
FIG. 1 illustrates a cross section perspective of an exemplary synchronous machine.

With reference to FIG. 1 there is illustrated one end of an exemplary synchronous machine 100 including a stator 110 and a rotor 120. It shall be appreciated that the arrangement of stator 110 and rotor 120 of machine 100 is illustrated for the purpose of explanation and is not intended as a limitation of the present disclosure and is not to be taken as an illustration of an exemplary embodiment drawn to scale. For example, rotor 120 may be implemented with any number of pole pairs greater than one pole pair. Stator 110 may be implemented with more or less stator winding phases 113a-c or stator slots 111. Since the number of stator slots 111 divided by the number of rotor poles of rotor pole pairs 121-125 is not an integer, the illustrated machine 100 is referred to as a fractional slot synchronous machine. In other embodiments, rotor 120 houses stator 110. Furthermore, machine 100 may be operated in either a motor mode or a generator mode.

Stator 110 is provided in an annular form and includes a plurality of slots 111 distributed circumferentially about the stator and facing inwardly toward the interior of the stator annulus. Stator winding phases 113a-c are disposed, or mounted, within the plurality of slots 111. Stator winding phases 113a-c may be arranged in a non-uniform pattern, as illustrated in FIG. 1, or in a uniform pattern. Stator winding phases 113a-c are coupled to power converter 140 and structured to transfer alternating current (AC) power between stator 110 and power converter 140. In certain embodiments, machine 100 may not be coupled to a power converter 140 and may instead be directly coupled to a utility grid or some other AC load. The AC power transferred between the stator winding phases and converter 140 includes a fundamental frequency and harmonic distortion, also known as harmonic power or a harmonic power component. In certain embodiments, the harmonic distortion is actively injected by converter 140. In certain embodiments, the harmonic distortion is generated during normal operation of machine 100.

Rotor 120 is a salient pole rotor including rotor pole pairs 121-125, a field winding 129, a set of multiphase energy harvest windings 127, and a direct current (DC) power supply 130. Each rotor pole pair includes two rotor poles located on opposite sides of rotor 120: rotor pole pair 121 includes rotor poles 121a and 121b, rotor pole pair 122 includes rotor poles 122a and 122b, rotor pole pair 123 includes rotor poles 123a and 123b, rotor pole pair 124 includes rotor poles 124a and 124b, and rotor pole pair 125 includes rotor poles 125a and 125b. In certain embodiments, rotor 120 is a non-salient structure, such as a cylindrical rotor. Unless specifically indicated to the contrary, reference to rotor structures such as poles, pole pairs, teeth, and slots shall be understood to be inclusive of both salient pole rotors and non-salient pole rotors such as cylindrical rotors.

The set of energy harvest windings 127 includes two windings structured to extract harmonic power from the air gap between stator 110 and rotor 120, which is used for powering field winding 129. The use of energy harvest windings 127 eliminates the need for a separate exciter unit. The number of phases of energy harvest windings is in part determined by the amount of air gap flux total harmonic distortion and the power demand of the field winding. In the illustrated embodiment, the power demand of field winding 129 requires two phases of energy harvest windings. It is important to note the number of phases of the set of energy harvest windings 127 is not limited or dictated by the number of pole pairs. In addition to powering the field winding, multiphase energy harvest windings may also reduce the impact of total harmonic distortion on the operation of a synchronous machine, since the windings 127 are more distributed around the rotor compared to single-phase excitation coils.

In the illustrated embodiment, energy harvest windings 127 are coupled to each rotor pole pair. In other embodiments, energy harvest windings 127 are coupled to less than all rotor pole pairs. For example, the energy harvest windings of one rotor pole pair may be coupled to DC power supply 130 and not coupled to the outer surface of another rotor pole pair. Instead, one energy harvest winding from multiple rotor pole pairs may be coupled to one point of rectifier 131. In this way, one or more rotor pole pairs may have individual energy harvest windings coupled to rectifier 131.

As the discussed in more detail below, windings 127 are arranged on each pole according to an identical pattern that is shifted by varying degrees relative to the axis of symmetry of each pole in order to electrically shift induced voltages of the harmonic power, thereby maximizing the amount of harmonic distortion that can be extracted from the air gap and reducing the complexity of DC power supply 130.

The set of energy harvest windings 127 are operatively coupled, such as being mounted, to each rotor pole of rotor pole pairs 121-125. In certain embodiments, the set of energy harvest windings are mounted to less than all rotor poles of rotor pole pairs 121-125. In the illustrated embodiment, the set of energy harvest windings 127 are mounted in an identical slot pattern 128 on each pole, on an outward surface of each rotor pole facing stator 110. It shall be appreciated that the slot pattern represents a sequence or order of slots and their position relative to the other slots, but is not intended to represent the position of the slots relative to the rotor pole. Therefore, an identical slot pattern is a sequence or order of slots having a fixed distance from each other on a rotor pole, but does not mean the slot pattern on each rotor pole is positioned in the same location on each rotor pole.

In certain embodiments, each rotor pole is comprised of a plurality of identical laminations stacked on top of each other, the laminations including the slot pattern. A lamination with a slot pattern shifted relative to an axis of symmetry may be stacked with a first side of each lamination facing one direction. The same lamination can produce an equal and opposite shift of the slot pattern relative to the axis of symmetry by stacking the first side of each lamination facing the opposite direction. For example, rotor pole 123a may be formed by stacking a plurality of laminations on top of each other with a first side facing towards the illustrated end. In order for rotor pole 124a to be a mirror image of rotor pole 123a, the same laminations as were used to form pole pair 123 may be stacked on top of each other with the first side facing away from the illustrated end. In this way, two different rotor pole configurations having equal and opposite shifted slot patterns may be formed using the same set of laminations.

For a fractional slot synchronous machine, the plurality of stator slots does not align with each rotor pole pair 121-125 in the same way. This offset causes an uneven flux distribution in the air gap between neighboring rotor poles, such as the rotor poles of pole pairs 121 and 122. If the energy harvest windings 127 were mounted within an identical but mechanically unshifted pattern, this would cause an electrically phase-shifted induced voltage for each energy harvest winding at each pole pair, cancelling out the induced voltage and reducing or elimination harmonic power output for each winding. As discussed below, the exemplary shifting slot pattern eliminates the phase shift of the induced voltage at each pole pair 121-125, allowing harmonic power to be extracted from the air gap for field winding 129.

DC power supply 130 is structured to receive harmonic power from the set of energy harvest windings 127, convert the received harmonic power to DC power, and output the DC power to field winding 129. Specifically, DC power supply 130 includes a rectifier 131 coupled to the set of energy harvest windings 127 and a DC current regulator 133 coupled to field winding 129 and rectifier 131. In other embodiments, DC power supply includes additional components, such as active filters, passive filters, or energy storage devices to name but a few examples. In preferred embodiments, such as the illustrated embodiment, the energy harvest windings 127 are mounted to multiple rotor pole pairs, as opposed to each pole pair having a separate set of multiphase energy harvest windings connected to a rectifier. The exemplary pattern of energy harvest windings reduces the size of the rectifier, allowing for reduced complexity of DC power supply 130. It shall be appreciated that that topologies of DC power supply 130, including rectifier 131 and DC current regulator 133 may be any topology structured to transfer power from the energy harvest windings to the field winding. For example, rectifier 131 may include active switching devices or diodes.

Field winding 129 is wrapped around each rotor pole and coupled to DC power supply 130. Field winding 129 is structured to generate a magnetic field using the DC power from DC power supply 130, specifically DC current regulator 133. The DC power received by regulator 133 may be modified by regulator 133, such as stepping up or stepping down the voltage. It shall be appreciated that any or all of the foregoing features of machine 100 may also be present in the other synchronous machines disclosed herein.

Figure 2:
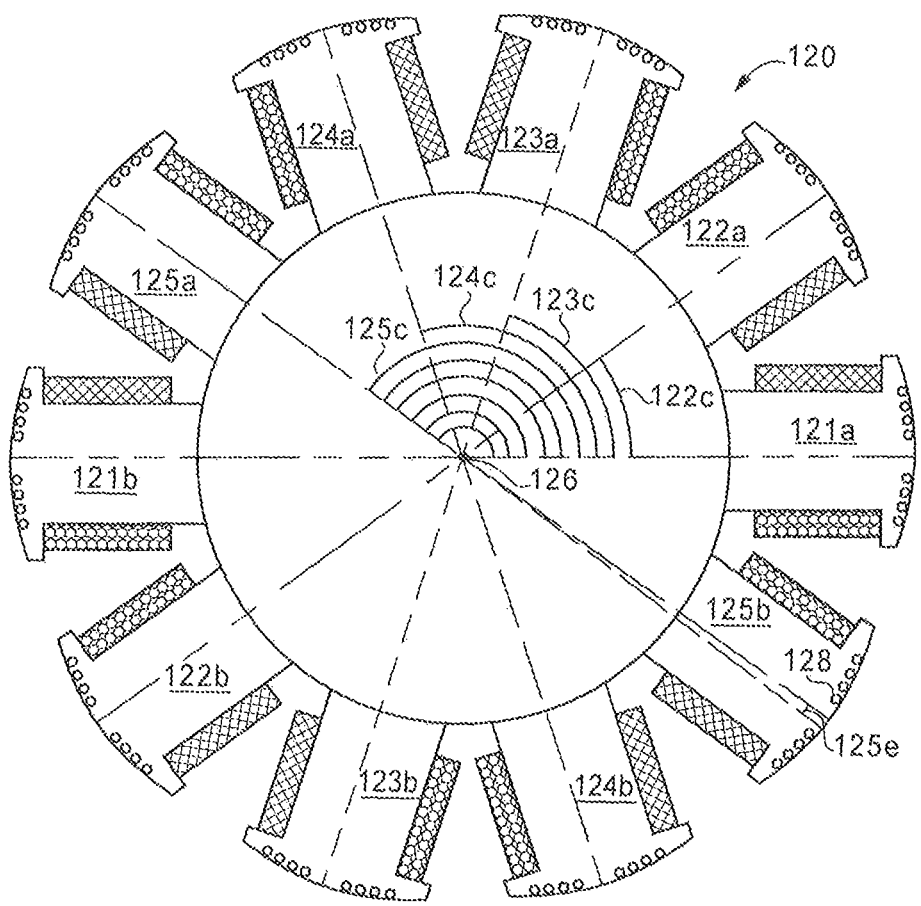
FIG. 2 illustrates a cross section perspective of the rotor of the exemplary synchronous machine in FIG. 1.

With reference to FIG. 2 there is the same end of exemplary rotor 120 illustrated in FIG. 1. As illustrated in FIG. 1, rotor 120 includes pole pairs 121-125 arranged in an equally spaced circular pattern around a rotor center point 126. As illustrated, each pole is divided into two equal portions by an axis of symmetry extending from rotor center point 126 to the outer surface of the rotor pole. It shall be appreciated that the two rotor poles of one rotor pole pair have identically oriented axes of symmetry.

The mechanical shift between the axis of symmetry of one rotor pole and the axis of symmetry for an adjacent rotor pole is equal to 360 degrees divided by the number of rotor poles. For example, the mechanical shift between two adjacent rotor poles of rotor 120 is 36 degrees. The orientation of each rotor pole pair of rotor 120 can be described in terms of the angle formed between the axis of symmetry of the rotor pole pair and the axis of symmetry of rotor pole 121a. Angle 122c represents the angle between the axis of symmetry of rotor poles 121a and 122a. Angle 123c represents the angle between the axis of symmetry of rotor poles 121a and 123a. Angle 124c represents the angle between the axis of symmetry of rotor poles 121a and 124a. Angle 125c represents the angle between the axis of symmetry of rotor poles 121a and 125a. The angle can describe the mechanical shift of each rotor pole, in which case, angle 122c is 36 degrees, angle 123c is 72 degrees, angle 124c is 108 degrees, and angle 125c is 144 degrees. The angle can also represent the electrical shift of each rotor pole, in which case, angle 122c is 72 degrees, angle 123c is 144 degrees, angle 124c is 216 degrees, and angle 125c is 288 degrees.

Rotor pole pairs 122-125 include the same slot pattern shifted along the outward edge of the rotor pole pair relative to the position of the slot pattern on rotor pole pair 121. For example, rotor pole pair includes slot pattern 128 on rotor pole 125a and rotor pole 125b. For each rotor pole, the slot pattern includes a center point, the location of which can be described by a reference line from center point 126 to the outer surface of a rotor pole, the reference line passing through the center of the slot pattern. A slot pattern angle is the angle between the axis of symmetry of a rotor pole and the reference line of the rotor pole. For example, slot pattern angle 125e represents the angle between the axis of symmetry of rotor pole 125b and the reference line passing through the center of slot pattern 128 on pole 125b. The slot pattern angles of each rotor pole pair is structured to eliminate the electrical phase shift of the induced voltages in each phase of the energy harvest windings while reducing unique rotor pole lamination patterns, as described in more detail below.

Figure 3:
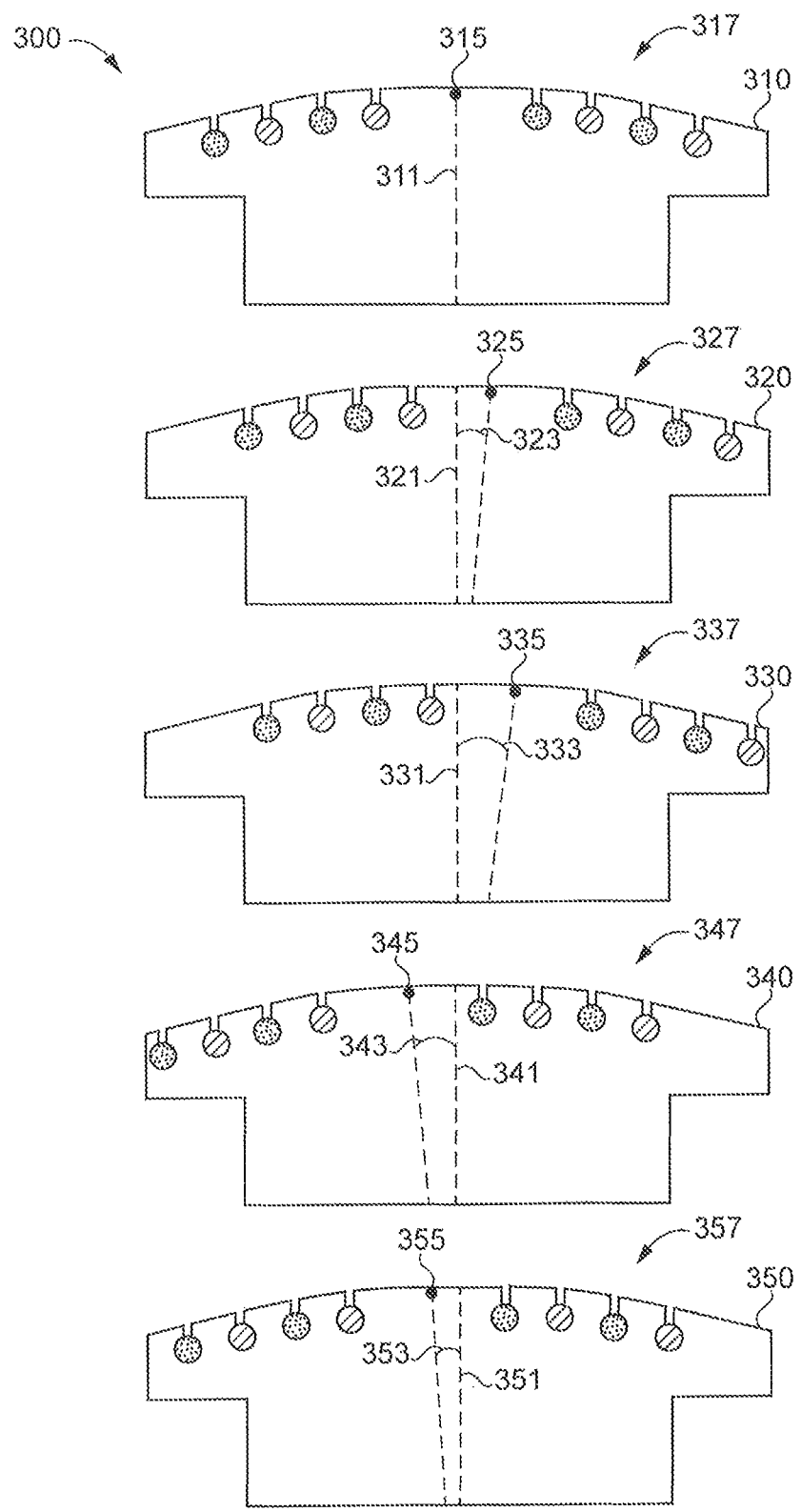
FIG. 3 illustrates exemplary laminations of the synchronous machine in FIG. 1.

With reference to FIG. 3 there are portions of exemplary laminations 300 illustrating exemplary slot and winding patterns. The set of laminations 300 includes lamination 310 representing one lamination of rotor pole pair 121 in FIG. 1, lamination 320 representing one lamination of rotor pole pair 122 in FIG. 1, lamination 330 representing one lamination of rotor pole pair 123 in FIG. 1, lamination 340 representing one lamination of rotor pole pair 124 in FIG. 1, and lamination 350 representing one lamination of rotor pole pair 125 in FIG. 1.

Each lamination of the set of laminations 300 includes an axis of symmetry equally dividing the lamination into left and right portions, as well as an identical two-phase winding pattern including two windings disposed in an identical pattern of slots. The center of each slot pattern is represented by a center point. Lamination 310 includes axis of symmetry 311, slot pattern 317, and slot pattern center point 315. Lamination 320 includes axis of symmetry 321, slot pattern 327, and slot pattern center point 325. Lamination 330 includes axis of symmetry 331, slot pattern 337, and slot pattern center point 335. Lamination 340 includes axis of symmetry 341, slot pattern 347, and slot pattern center point 345. Lamination 350 includes axis of symmetry 351, slot pattern 357, and slot pattern center point 355.

In the illustrated embodiment, the winding pattern includes two-phase energy harvest windings arranged in alternating slots. In other embodiments, the number of energy harvest windings may have one phase or more than two phases, and the sequence of windings may be arbitrary, as long as the winding pattern is the same on all rotor pairs. It shall be appreciated that the winding patterns are the same in that the order or sequence of the windings located in the slots is identical, even though the position of the windings in the winding pattern on each rotor pole is different.

Slot pattern center point 315 of lamination 310 is aligned with axis of symmetry 311. However, for each of the other laminations of the set of laminations 300, the center point of the slot pattern is offset from the axis of symmetry. The degree of the mechanical shift is represented by an angle 323, 333, 343, 353 between the axis of symmetry and a reference line extending from the center of the rotor to the slot pattern center point. The shifted slot pattern on laminations 320, 330, 340, and 350 is structured to compensate for the electrical phase shift in a fractional slot synchronous machine. A set of equations is used to determine the angles of the mechanical shift for the slot pattern on each lamination. First, fractional stator Q is first determined using the following formula, where S is the number of slots, $\varphi$ is the number of stator winding phases, and P is the number of rotor poles.

$$\text{stator } Q = \frac{S}{\varphi * P} \quad (1)$$

Since the energy harvest windings are structured to harvest harmonic power, the fractional remainder of stator Q will cause an electrical phase shift in the induced voltage at each rotor pole. Next, the following equation is used to determine the electrical phase shift caused by the fractional stator Q, where frac( ) is a fractional remainder function.

$$E_{shift} = \text{frac(stator } Q) * 360° \quad (2)$$

In order to offset the electrical phase shift, the mechanical shift angle of each pole may be determined by the following equation, where m is an index number of the rotor pole pair, $M_{shift}$ is the compensation angle, and $Q_s$ is the number of stator slots:

$$M_{shift} = (m-1)\frac{E_{shift}}{Q_s} \quad (3)$$

The index number of each rotor pole pair is assigned using the calculated $E_{shift}$ value in equation (2). One rotor pole pair is assigned an index number of 1. The other rotor pole pairs are assigned index numbers in the ascending order corresponding to an ascending electrical phase shift. For example, the rotor pole pair having an electrical phase shift relative to the first rotor pole pair of $E_{shift}$ is assigned an index number of 2 and the rotor pole pair having an electrical phase shift relative to the first rotor pole pair of two times $E_{shift}$ is assigned an index number of 3.

One disadvantage to the shifting slot pattern is the number of different rotor lamination patterns that need to be stamped. To reduce the number of stamping patterns, some of the laminations may be flipped, or mirrored. A rotor pole may be formed using mirrored laminations of another rotor pole if the following equation is satisfied, where $m_1$ is the index number of the first rotor pole pair and $m_2$ is the index number of the second rotor pole pair:

$$e^{[(m_1-1)+(m_2-1)]jE_{shift}} = e^{j360°} = \hat{1} \quad (4)$$

For the purposes of illustration, equations (1)-(4) can be used to determine the mechanical shift angles and number of unique laminations required for machine 100 which includes 96 stator slots, 3 phases of stator winding phases, and 10 poles. Using equation (1) the stator Q of synchronous machine 100 is equal to 96 divided by the result of three times ten, or 3.2. Using equation (2), the electrical phase shift of synchronous machine 100 is equal to 0.2 times 360 degrees, or 72 degrees. Using equation (3), the mechanical shift angle for each rotor pole in synchronous machine 100 is equal to 0.75 degrees times the result of the index number minus 1. For example, assume pole pair 121 has an index of 1, pole pair 122 has an index of 4, pole pair 123 has an index of 2, pole pair 124 has an index of 5, and pole pair 125 has an index of 3. Therefore, the mechanical shift angle is zero degrees for pole pair 121, 0.75 degrees for pole pair 123, 1.5 degrees for pole pair 125, 2.25 degrees for pole pair 122, and 3 degrees for pole pair 124.

Since each pole pair has a different mechanical shift, it would appear five different lamination configurations must be used. However, using equation (4) it can be determined that only three different laminations are required. A rotor pole may be formed from mirrored laminations of another rotor pole where the sum of the electrical phase shift $E_{shift}$ for each pole pair is 360 degrees. Therefore, pole pair 125 may be formed by mirroring the laminations used to form pole pair 122, and pole pair 124 may be formed by mirroring the laminations used to form pole pair 123. As illustrated in FIG. 3, lamination 350 has the same configuration as lamination 320 with an angle 353 being equal and opposite to angle 232. Lamination 340 has the same configuration as lamination 340 with an angle 343 being equal and opposite to angle 333. It shall be appreciated that any or all of the foregoing features of the set of laminations 300 may also be present in the other rotor poles or laminations disclosed herein.

Figure 4A:
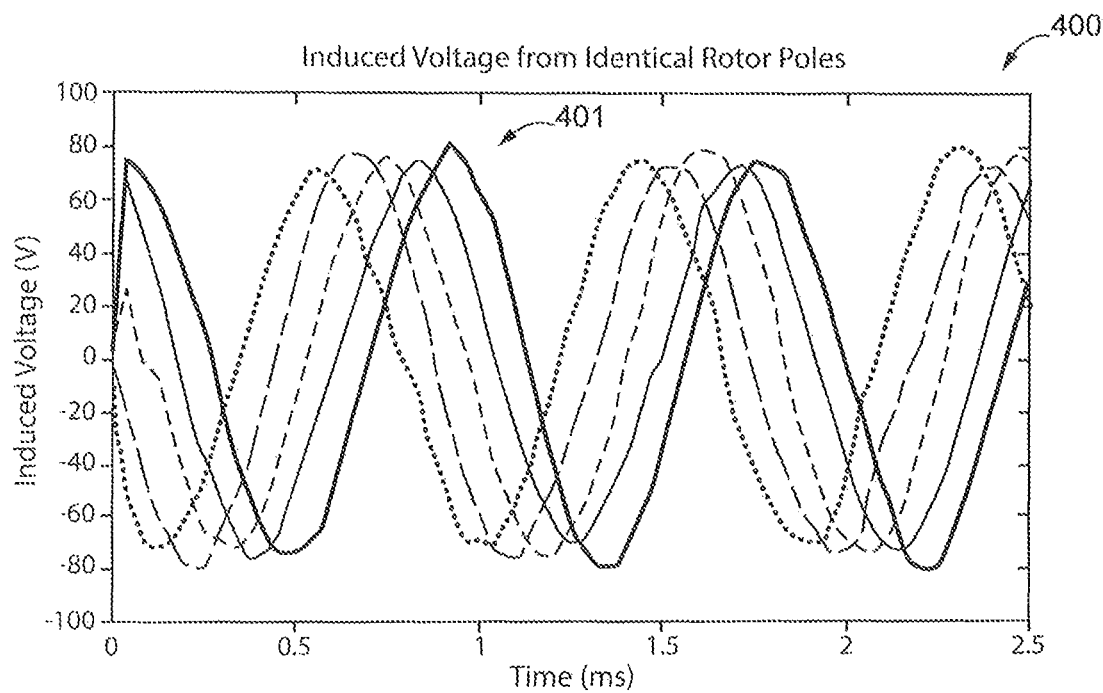
FIG. 4A-B are graphs illustrating electrical characteristics of the exemplary synchronous machine in FIG. 1.
Figure 4B:
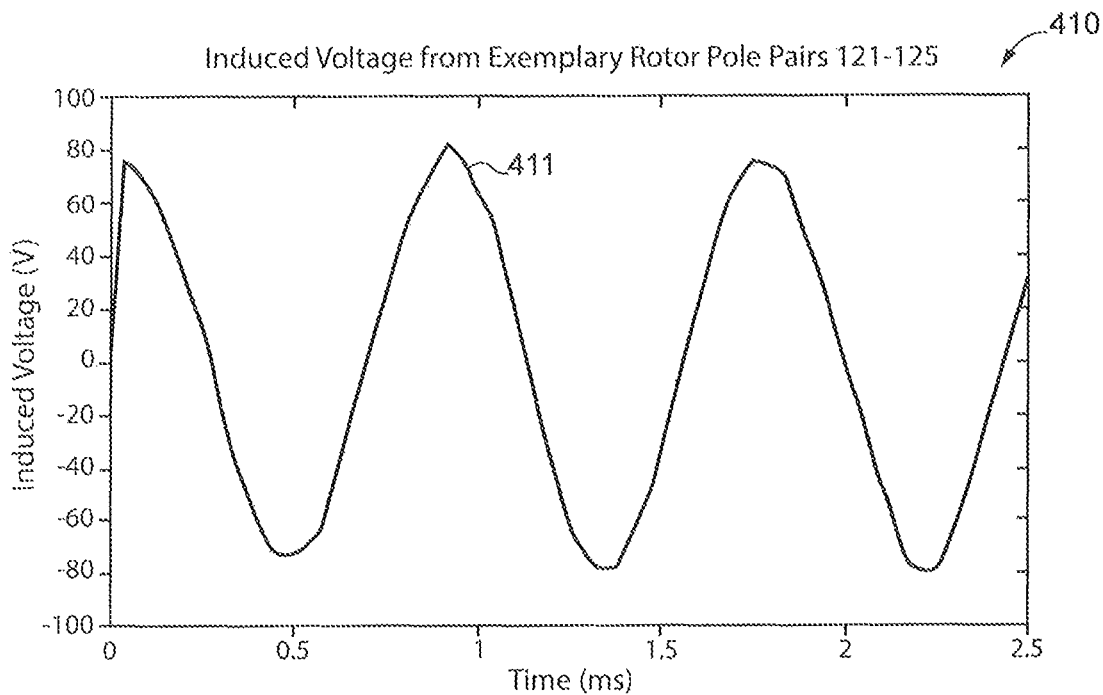

With reference to FIG. 4A there is a graph 400 illustrating induced voltages 401 of one phase of energy harvesting windings arranged in an identical but unshifted pattern on each rotor pole pair of a synchronous machine. As illustrated, the induced voltages 401 from each rotor pole are phase shifted, causing the induced voltages to cancel out. By contrast, FIG. 4B is a graph 410 illustrating the induced voltage 411 generated by the windings in the slot patterns illustrated in FIG. 3. Keeping the windings in the same pattern while shifting the slot pattern on the outer surface of the rotor causes the induce voltages to overlap, generating power for the field winding that can be used to power the field winding.

Figure 5:
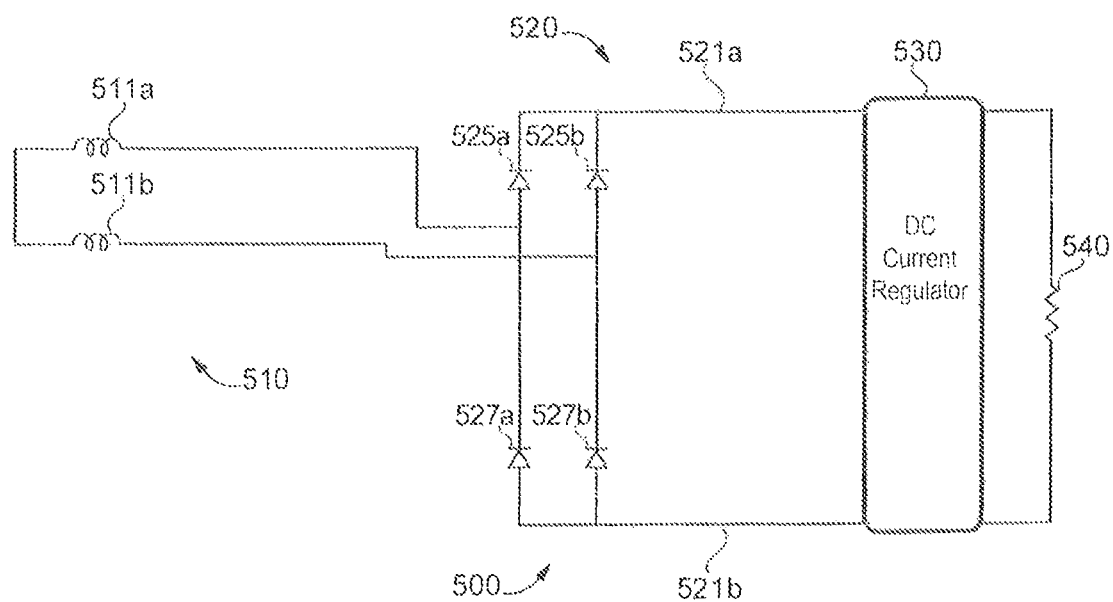
FIG. 5 illustrates an exemplary DC power supply.

With reference to FIG. 5 there is illustrated an exemplary energy harvesting circuit 500 for machine 100 in FIG. 1. Circuit 500 includes a set of energy harvest windings 510 coupled together at a common node and also coupled individually coupled to rectifier 520. In other embodiments, the set of energy harvest windings 510 are coupled together in a zig-zag configuration instead of coupled at a common node. The set of energy harvest windings 510 include windings 511*a* and 511*b*.

Rectifier 520 includes a plurality of legs coupled between DC rails 521*a* and 521*b*. Each leg includes two series coupled semiconductor devices connected at a midpoint connection. For example, one leg includes semiconductor devices 525*a* and 527*a*, and one leg includes semiconductor devices 525*b* and 527*b*. Each energy harvest winding is coupled to one leg of rectifier 520 by way of a midpoint connection. In the illustrated embodiment, the semiconductor devices of rectifier 520 are diodes. In other embodiments, some of the semiconductor devices may be semiconductor switches.

Harmonic AC power received with windings 511*a* and 511*b* is rectified with rectifier 520 and transmitted to DC current regulator 530 by way of rails 521*a*, 521*b*. DC current regulator 530 is structured to receive the DC power from rectifier 520, increase or decrease the current of the received power according to a prescribed current level in a field winding 540, and output the power to field winding 540.

Further written description of a number of exemplary embodiments shall now be provided. One embodiment is a fractional slot synchronous machine comprising a stator including a plurality of stator winding phases arranged in a plurality of stator slots; a rotor comprising: a first pole pair including a first pole including a first plurality of slots having a first center point and arranged on a first outer surface in a slot pattern; a second pole pair including a second pole including a second plurality of slots having a second center point and arranged on a second outer surface in the slot pattern; a first energy harvest winding arranged in a winding pattern within a portion of the first plurality of slots and a second energy harvest winding arranged in the winding pattern within a portion of the second plurality of slots, the first and second energy harvest windings being structured to receive a harmonic power from the plurality of stator winding phases; and a rectifier structured to receive the harmonic power from the first and second energy harvest windings and convert the received harmonic power to DC power.

In certain forms of the foregoing fractional slot synchronous machine, the slot pattern includes a center point, the first pole includes a first axis of symmetry, and the second pole includes a second axis of symmetry, wherein a first angle is formed by the first axis of symmetry and a first reference line extending from a center of the rotor to the first center point, wherein a second angle is formed by the second axis of symmetry and a second reference line extending from the center of the rotor to the second center point, and wherein the second angle is greater than the first angle. In certain forms, the second angle is equal to 360 degrees times a remainder of fractional stator Q divided by the number of stator slots, the fractional stator Q being the number of stator slots divided by the result of the number of stator winding phases times the number of rotor poles of the rotor. In certain forms, the rotor comprises a third pole pair including a third pole including a third plurality of slots having a third center point of and arranged on a third outer surface in the slot pattern, wherein the third pole includes a third axis of symmetry, wherein a third angle is formed by the third axis of symmetry and a third reference line extending from the center of the rotor to the third center point, and wherein the third angle is twice the number of degrees as the second angle. In certain forms, the rotor comprises a third pole pair including a third pole including a third plurality of slots having a third center point and arranged on a third outer surface in the slot pattern, wherein the third pole includes a third axis of symmetry, wherein a third angle is formed by the third axis of symmetry and a third reference line extending from a center of the rotor to the third center point, and wherein the third angle is equal and opposite to the second angle. In certain forms, the rotor comprises a first plurality of energy harvest winding arranged in a multiphase winding pattern within the first plurality of slots and a second plurality of energy harvest windings arranged in the multiphase winding pattern within the second plurality of slots. In certain forms, the first and second pluralities of energy harvest windings are coupled to the rectifier, the rectifier being structured to receive harmonic power from each energy harvest winding, convert the harmonic power to DC power, and output the DC power to a rotor field winding.

Another exemplary embodiment is a rotor comprising: a plurality of rotor poles including a first pole and a second pole; and a plurality of energy harvest windings mounted on a first outer surface of the first pole in a winding pattern and mounted on a second outer surface of the second pole in the winding pattern, wherein the first pole is structured such that a first axis of symmetry of the first pole and a first reference line between a center of the rotor and a center of the winding pattern on the first pole forms a first angle, and wherein the second pole is structured such that a second axis of symmetry of the second pole and a second reference line between the center of the rotor and a center of the winding pattern on the second pole forms a second angle different than the first angle. In certain forms of the foregoing rotor, the rotor is structured to be inserted into a stator, the stator comprising a plurality of windings and a plurality of slots, and wherein the plurality of energy harvest windings is structured to receive a harmonic power from the plurality of stator winding phases. In certain forms, the number of stator slots of the stator divided by the number of rotor poles is not an integer. In certain forms, the difference between the first angle and the second angle is equal to 360 degrees times a remainder of a fractional stator Q divided by the number of stator slots, the fractional stator Q being the number of stator slots divided by the result of the number of stator winding phases times the number of rotor poles of the rotor. In certain forms, the plurality of rotor poles includes a third pole including a third outer surface, wherein the plurality of energy harvest windings mounted on the third outer surface of the second pole in the winding pattern, wherein the third pole is structured such that the axis of symmetry of the third pole and a third reference line between the center of the rotor and a center of the winding pattern on the third pole forms a third angle being twice the difference between the second angle and the first angle. In certain forms, the plurality of rotor poles includes a third pole including a third outer surface, wherein the plurality of energy harvest windings mounted on the third outer surface of the second pole in the winding pattern, wherein the third pole is structured such that the axis of symmetry of the third pole and a third reference line between the center of the rotor and a center of the winding pattern on the third pole forms a third angle being equal and opposite to the difference between the second angle and the first angle. In certain forms, the rotor includes a plurality of identical laminations, and wherein the second pole is comprised of a first portion of the plurality of identical laminations and the third pole is comprised of a second portion of the plurality of identical laminations. In certain forms, the rotor comprises a DC power supply including a rectifier coupled to the plurality of energy harvest windings and structured to receive harmonic power from the plurality of energy harvest windings and provide DC power to a field winding.

A further exemplary embodiment is a method for constructing a fractional slot synchronous machine comprising: forming a first set of laminations and a second set of laminations, the second set of laminations include a front side and a back side; forming a first rotor pole using the first set of laminations; forming a second rotor pole using a first portion of the second set of laminations; forming a third rotor pole using a second portion of the second set of laminations; and forming a rotor using the first rotor pole, the second rotor pole, and the third rotor pole, wherein the front side of each lamination of the first portion of the second set of laminations is oriented towards a first end of the rotor and the back side of each lamination of the second portion of the second set of laminations is oriented towards the first end, wherein each lamination of the first set of laminations includes a first axis of symmetry and a first slot pattern having a first center point, wherein the first center point is aligned with the first axis of symmetry, and wherein each lamination of the second set of laminations includes a second axis of symmetry and a second slot pattern having a second center point, wherein the second center point is not aligned with the second axis of symmetry.

In certain forms of the foregoing method, the method comprises mounting an energy harvest winding within the first slot pattern of each lamination of the first set of laminations; and mounting the energy harvest winding within the second slot pattern of each lamination of the second set of laminations of the second rotor pole and the third rotor pole. In certain forms, the method comprises receiving harmonic power from a stator with the energy harvest winding; converting the harmonic power to DC power; and providing the DC power to a rotor field winding. In certain forms, the method comprises forming a stator comprising a plurality of stator slots and a plurality of stator winding phases, wherein the rotor includes a plurality of rotor poles including the first rotor pole, the second rotor pole, and the third rotor pole. In certain forms, an angle between the second axis of symmetry and a reference line extending from a center point of the rotor to the second center point for each lamination of the second set of laminations is equal to 360 degrees times a remainder of a fractional stator Q divided by the number of stator slots, the fractional stator Q being the number of stator slots divided by the result of the number of stator winding phases times the number of rotor poles of the rotor.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:
1. A rotor comprising:
a plurality of rotor poles including a first pole and a second pole; and
a plurality of energy harvest windings mounted on a first outer surface of the first pole in a winding pattern and mounted on a second outer surface of the second pole in the winding pattern,
wherein the first pole is structured such that a first axis of symmetry of the first pole and a first reference line between a center of the rotor and a center of the winding pattern on the first pole forms a first angle, wherein the second pole is structured such that a second axis of symmetry of the second pole and a second reference line between the center of the rotor and a center of the winding pattern on the second pole forms a second angle different than the first angle, and wherein the rotor is structured to be inserted into a stator, the stator comprising a plurality of windings and a plurality of slots, and wherein the difference between the first angle and the second angle is equal to 360 degrees times a remainder of a fractional stator Q divided by the number of stator slots, the fractional stator Q being the number of stator slots divided by the result of the number of stator winding phases times the number of rotor poles of the rotor.

2. The rotor of claim 1 wherein the plurality of energy harvest windings is structured to receive a harmonic power from the plurality of stator winding phases.

3. The rotor of claim 2 wherein the number of stator slots of the stator divided by the number of rotor poles is not an integer.

4. The rotor of claim 1 wherein the plurality of rotor poles includes a third pole including a third outer surface, wherein the plurality of energy harvest windings mounted on the third outer surface of the second pole in the winding pattern, wherein the third pole is structured such that the axis of symmetry of the third pole and a third reference line between the center of the rotor and a center of the winding pattern on the third pole forms a third angle being twice the difference between the second angle and the first angle.

5. The rotor of claim 1 wherein the plurality of rotor poles includes a third pole including a third outer surface, wherein the plurality of energy harvest windings mounted on the third outer surface of the second pole in the winding pattern, wherein the third pole is structured such that the axis of symmetry of the third pole and a third reference line between the center of the rotor and a center of the winding pattern on the third pole forms a third angle being equal and opposite to the difference between the second angle and the first angle.

6. The rotor of claim 5 wherein the rotor includes a plurality of identical laminations, and wherein the second pole is comprised of a first portion of the plurality of identical laminations and the third pole is comprised of a second portion of the plurality of identical laminations.

7. The rotor of claim 1 comprising a DC power supply including a rectifier coupled to the plurality of energy harvest windings and structured to receive harmonic power from the plurality of energy harvest windings and provide DC power to a field winding.

8. The rotor of claim 1 wherein the first pole and the second pole are comprised of a plurality of identical laminations, and wherein the following equation is satisfied, where $m_1$ is a first index number of the first rotor pole, $m_2$ is an index number of the second pole, and $E_{shift}$ is an electrical phase shift;

$$e^{[(m_1-1)+(m_2-1)]jE_{shift}} = e^{j360°} = \hat{1}.$$

9. The rotor of claim 8 wherein the electrical phase shift is determined by the following equations, where $E_{shift}$ is the electrical phase shift, frac( ) is a fractional remainder function, S is a first number of the plurality of slots, $\varphi$ is a second number of stator winding phases, and P is a third number of total rotor poles of the rotor;

$$E_{shift} = frac\left(\frac{S}{\varphi * P}\right) * 360°.$$

10. A fractional slot synchronous machine comprising:
a stator including a plurality of windings and a plurality of slots; and
a rotor including:
a plurality of rotor poles including a first pole and a second pole, and
a plurality of energy harvest windings mounted on a first outer surface of the first pole in a winding pattern and mounted on a second outer surface of the second pole in the winding pattern,
wherein the first pole is structured such that a first axis of symmetry of the first pole and a first reference line between a center of the rotor and a center of the winding pattern on the first pole forms a first angle,
wherein the second pole is structured such that a second axis of symmetry of the second pole and a second reference line between the center of the rotor and a center of the winding pattern on the second pole forms a second angle different than the first angle, and
wherein the difference between the first angle and the second angle is equal to 360 degrees times a remainder of a fractional stator Q divided by the number of stator slots, wherein the fractional stator Q is the number of stator slots divided by the result of the number of stator winding phases times the number of rotor poles of the rotor.

11. The fractional slot synchronous machine of claim 10 wherein the plurality of energy harvest windings is structured to receive a harmonic power from the plurality of stator winding phases.

12. The fractional slot synchronous machine of claim 11 wherein the number of stator slots of the stator divided by the number of rotor poles is not an integer.

13. The fractional slot synchronous machine of claim 10 wherein the plurality of rotor poles includes a third pole including a third outer surface, wherein the plurality of energy harvest windings mounted on the third outer surface of the second pole in the winding pattern, wherein the third pole is structured such that the axis of symmetry a third circumferential centerline of the third pole and a third reference line between the center of the rotor and a center of the winding pattern on the third pole forms a third angle being twice the difference between the second angle and the first angle.

14. The fractional slot synchronous machine of claim 10 wherein the plurality of rotor poles includes a third pole including a third outer surface, wherein the plurality of energy harvest windings mounted on the third outer surface of the second pole in the winding pattern, wherein the third pole is structured such that the axis of symmetry of the third pole and a third reference line between the center of the rotor and a center of the winding pattern on the third pole forms a third angle being equal and opposite to the difference between the second angle and the first angle.

15. The fractional slot synchronous machine of claim 14 wherein the rotor includes a plurality of identical laminations, and wherein the second pole is comprised of a first portion of the plurality of identical laminations and the third pole is comprised of a second portion of the plurality of identical laminations.

16. The fractional slot synchronous machine of claim 10 comprising a DC power supply including a rectifier coupled to the plurality of energy harvest windings and structured to receive harmonic power from the plurality of energy harvest windings and provide DC power to a field winding.

17. The fractional slot synchronous machine of claim 10 wherein the first pole and the second pole are comprised of a plurality of identical laminations, and wherein the following equation is satisfied, where $m_1$ is a first index number of the first rotor pole, $m_2$ is an index number of the second pole, and $E_{shift}$ is an electrical phase shift;

$$e^{[(m_1-1)+(m_2-1)]jE_{shift}} = e^{j360°} = \hat{1}.$$

18. The fractional slot synchronous machine of claim 17 wherein the electrical phase shift is determined by the following equations, where $E_{shift}$ is the electrical phase shift, frac( ) is a fractional remainder function, S is a first number of the plurality of slots, $\varphi$ is a second number of stator winding phases, and P is a third number of total rotor poles of the rotor;

$$E_{shift} = frac\left(\frac{S}{\varphi * P}\right) * 360°.$$

* * * * *